May 28, 1963 R. J. MATT 3,091,469
SEAL

Filed March 4, 1959 2 Sheets-Sheet 1

Inventor
RICHARD J. MATT
by Hill, Sherman, Meroni, Gross & Simpson Attys.

May 28, 1963   R. J. MATT   3,091,469
SEAL

Filed March 4, 1959   2 Sheets-Sheet 2

Inventor
RICHARD J. MATT
by Hill, Sherman, Meroni, Gross & Simpson Attys.

United States Patent Office 3,091,469
Patented May 28, 1963

3,091,469
SEAL
Richard J. Matt, South Euclid, Ohio, assignor to Thompson Ramo Wooldridge Inc., Cleveland, Ohio, a corporation of Ohio
Filed Mar. 4, 1959, Ser. No. 797,196
5 Claims. (Cl. 277—1)

The present invention relates to improvements in rotary seals, and more particularly to the provision of a sealing system providing an absolute seal for preventing the leakage of fission products or contaminants along a shaft during non-rotation and over varying rotational speeds of the shaft and accommodating a pressure differential along the shaft.

The present invention contemplates use in environments such as where a motor-driven pump unit operates at variable speeds to pump a radioactive material. A positive seal must be provided for the shaft between the pump and motor to prevent the escape of radioactive material from the pump, and to prevent the contamination of radioactive material, due to leakage of lubricant or the like from the motor to the pump. A rotary dynamic liquid seal is employed, using bismuth as a sealing liquid. The sealing liquid is contained in an annular chamber around the shaft and an impeller extends into the chamber to centrifugally force the liquid bismuth outwardly and form a pressure seal between the outer edge of the impeller and the chamber. The shaft is adapted for operation in a vertical position with the drive motor at the upper end of the shaft being enclosed in a can which is filled with helium maintained under a slight pressure providing a helium blanket at one side of the dynamic seal, and the helium may be changed if radioactivity rises above a predetermined minimum limit. Below the liquid dynamic seal is a second gas chamber which is pressurized at slow rotational speeds of the shaft to balance pressures across the dynamic seal, and prevent blow-out of the liquid seal. Below the second gas chamber is a rotary shaft seal which permits pressurizing the chamber. A heater is provided to liquify the bismuth for rotation of the shaft, and a cooling mechanism is provided to solidify the bismuth during periods of non-rotation of the shaft.

It is an object of the present invention to provide an improved dynamic seal system which provides an absolute seal preventing the leakage of fluids along a rotating shaft which is especially well adapted to prevent the commingling of contaminants on one side of the seal and radioactive material on the other side of the seal.

Another object of the invention is to provide an improved liquid dynamic seal which utilizes a centrifugal force of an impeller on a liquid for providing a seal and which is capable of satisfactory absolute sealing operation under varying shaft speeds and which continues to provide a seal when the shaft is stopped.

Another object of the invention is to provide an improved rotary shaft seal system wherein a portion is capable of maintaining an absolute seal during non-rotation of the shaft permitting the parts to be disassembled without leakage.

Another object of the invention is to provide a dynamic liquid seal which permits a liberal tolerance of gas pressure across the seal during operation.

Another object of the invention is to provide an improved, long-running, dry rotary seal of the face-to-face type.

Other objects and advantages will become more apparent with the disclosure of the preferred embodiments of the invention in the following specification, claims and in the appended drawings, in which:

As shown on the drawings.

Figures 1, 2:
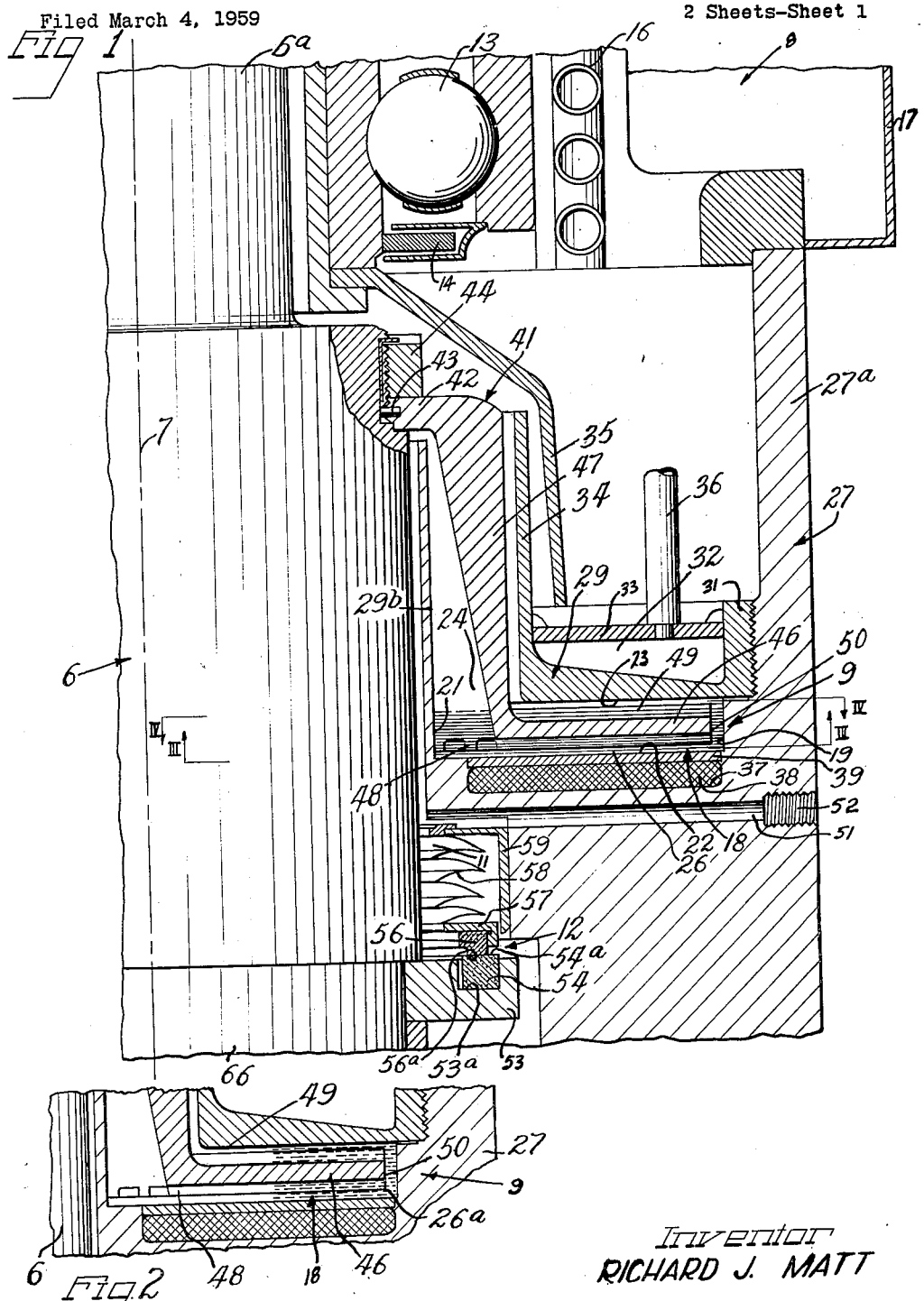
FIGURE 1 is a vertical sectional view taken through the axis of a shaft provided with a seal system embodying the principles of the present invention and illustrating the parts in enlarged detail, showing only one-half of the section through the shaft.
FIGURE 2 is a fragmentary sectional view of FIGURE 1 illustrating the position of the liquid in the seal when the shaft is rotating.

A shaft 6 to be sealed is preferably operated with its axis 7 in a vertical position, and is driven at its upper end 6a by a motor (not shown) and at its lower end 6b drives a pump (not shown). While the principles of the invention are well adapted to various environments, the sealing system for the shaft functions as an absolute seal, and in the embodiment illustrated, the pump will be referred to as pumping radioactive material which must be prevented from leaking along the shaft. The lubricants of the motor must be prevented from leaking along the shaft to mix with the fluid being pumped.

At a first location near the upper end of the shaft is defined a first gas chamber 8. The chamber is filled with gas such as helium, which acts as a coolant for the electric motor and the windings and means (not shown) are provided for changing the helium if its radioactive level rises above a predetermined minimum. The helium gas chamber 8 provides a gas blanket for a dynamic liquid seal 9 positioned at a second location along the shaft below the gas chamber 8. Below the liquid seal 9 is a second gas chamber 11, which is at a third location, below the liquid seal, and the gas chamber 11 is closed by a rotary seal 12, which is positioned at a fourth location along the shaft.

At the upper end 6a of the shaft, a ball bearing 13 is provided for the shaft and motor and has a lubricant slinger shield 14. Bearing cooling coils 16 are located in heat-transfer relationship to the bearing. The motor and bearing assembly are enclosed in a can 17, which defines the chamber 8 containing the helium coolant which forms a blanket at one side of the dynamic liquid seal 9. Connections which are not shown, are provided for the can 17 for pressurizing the chamber 8 to a pressure slightly above atmospheric pressure, and on the order of 17 p.s.i.a. The can 17 is hermetically sealed, and the gas blanket in the chamber 8 and the sealed motor unit provide the necessary assurance that any leakage of radioactive products will be contained and purged out of the area above the dynamic seal 9.

The dynamic liquid seal 9 includes an annular liquid sealing chamber 18 which generally faces radially inwardly toward the shaft 6, and has an outer wall 19, an inner wall 21, and a lower wall 22, which extends across between the outer and inner walls 19 and 21. The chamber is also defined by an upper wall 23 which extends inwardly from the outer wall 19 a portion of the distance to the inner wall to leave an annular gap 24. The chamber extends annularly around the shaft and contains a pool of material such as a metal which can be changed between liquid and solid state, and which in the preferred form is bismuth 26. Sufficient bismuth is filled into the chamber 18 to keep the seal chamber flooded over the entire range of operation.

The sealing liquid chamber 18 is formed in part by the annular housing 27, which is connected at its upper end to the can 17, and which extends around the shaft 6. The housing is formed of cast material, and has an outer flange 27a joined to the can 17, and projecting upwardly at its upper end. An inner coaxial spaced flange 27b extends axially adjacent the shaft 6 and forms a space 24 above the chamber 18 containing the pool of bismuth 26. Coaxially with the flange 27b and outwardly therefrom at the other side of the space 24 is an axially extending flange portion 34 of an element 29 which provides a lower surface providing the upper wall 23 of the liquid chamber. The element 29 has an outer flange 31 which is threaded so that it can be screwed into the housing 27. Space between the flanges 31 and 34 provides an annular cooling chamber 32. A flared baffle flange 35 is connected to the support for the bearing 13 and extends down over the flange portion 34.

The cooling chamber provides a cooling element which is in heat-transfer relationship to the liquid bismuth pool 26 so as to be able to solidify the pool during non-rotation of the shaft and provide a fixed absolute seal. Above the cooling chamber 32 is a plate 33 which is annular in shape and which is welded in the space between the flanges 31 and 34. A coolant conduit 36 is tapped through the plate 33 to lead into the chamber 32 for supplying cooling fluid, and an additional conduit may be provided for the circulation of fluid.

Since bismuth has a melting temperature of 520° F., it is necesary to provide a heater to melt the metal bismuth after any period that the pump is shut down in order to again rotate the shaft 6. For this purpose, a cavity 37 is provided in the housing 27, beneath the sealing fluid chamber 18, and an annular heating coil 38 is located in the cavity 37. The cavity is closed by an annular plate 39, the upper surface of which provides the lower wall 22 of the chamber 18. The heating coil 38 is electrically energized and provided with suitable leads (not shown) to maintain the bismuth in a liquid state during operation.

The dynamic seal includes a rotary member for pumping fluid under pressure into the sealing chamber to form a seal and the rotary member is in the form of an annular centrifugal impeller 41. The impeller has an inwardly extending flange portion 42 provided for connecting to the shaft and the flange portion is locked against rotation by a pin 43, and is secured to the shaft by a nut 44, threaded onto the shaft. The impeller 41 has an axially extending portion 47 which projects axially into the space 24 between the flanges 27b and 34. At the end of the portion 47 is an annular radially outwardly extending flange portion 46 which extends into the pool of bismuth 26, and which centrifugally forces the bismuth outwardly to form a pressure seal at the outer edge 50 of the impeller flange 46.

Figure 3:
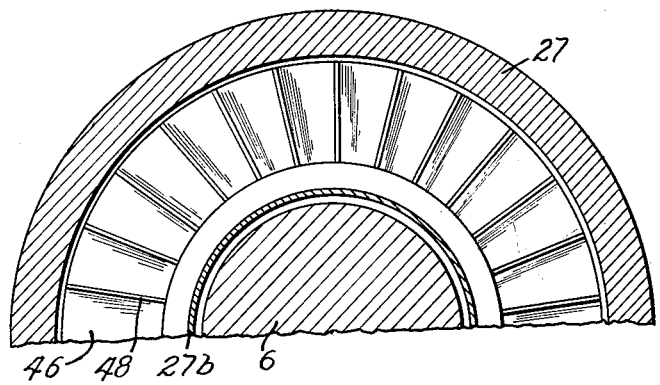
FIGURE 3 is a horizontal sectional view taken substantially along line III—III of FIGURE 1.
Figure 4:
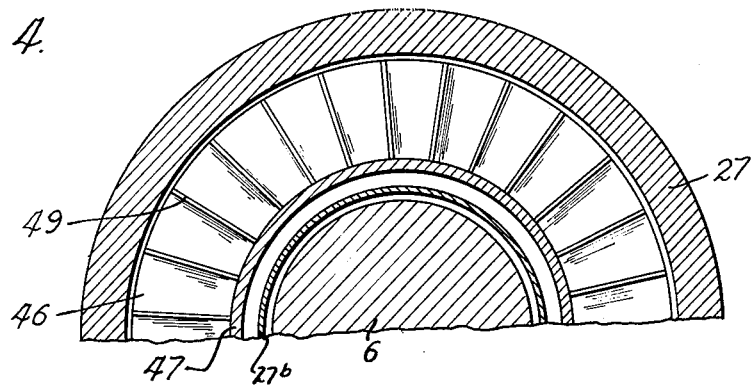
FIGURE 4 is a horizontal sectional view taken substantially along line IV—IV of FIGURE 1; and, FIGURE 5 is a vertical sectional view taken through the axis of the shaft and illustrating a modified form of the rotary face seal portion of the sealing system.

As illustrated in FIGURES 1, 3 and 4, the impeller flange 46 may be provided with means for aiding in increasing the seal pressure and is shown as having a series of radially extending raised vanes 48 projecting downwardly from its lower surface, particularly as illustrated in FIGURE 3. The impeller flange 46 also has a plurality of radially extending raised vanes, 49, on its upper surface, particularly as illustrated in FIGURE 4.

The purpose of the dynamic seal is to create a centrifugal pressure at the outer edge of the impeller flange 46 such that normal operation of the pump results in a liquid-to-gas interface along the radial surface of the impeller rather than along the shaft. In affect, what this does is lengthen the effect of the column of fluid which is sealing the gas, and make the value of gas pressure less sensitive in the over-all operation of the pump.

The operation of the dynamic seal creates a pressure gradient from the shaft to the outer cavity of the chamber of the dynamic seal. Since the vanes on the upper side of the impeller are shorter than those of the lower side, in the form illustrated, the gradient generated by the upper vanes is less than the gradient which can be supported by the lower vanes. The net result is that the gradient from the dynamic seal cavity to the shaft on the upper side of the seal can be supported by a ring of fluid at the periphery of the dynamic seal with a liquid-to-gas interface between the shaft and the tip of the dynamic seal. The position of the liquid bismuth during rotation of the shaft at normal high speeds is illustrated in detail in FIGURE 2 with the bismuth pool 26a forced outwardly by the action of the vanes 48 and 49 to form a pressure seal at the tip or outer edge 50 of the impeller flange 46.

The radial height or position of the liquid bismuth for stable operation is determined by the value of gas pressure along the shaft. If a high pressure gradient is maintained across the dynamic seal, a liberal tolerance on the gas pressure is possible. The tolerance that may be allowed on the gas pressure is a function of the minimum pressure gradient. Naturally, the minimum pressure gradient occurs at the lowest operational speed. At low operational speeds, the pressure drop across the liquid seal is reduced to zero to prevent the liquid bismuth from being blown out of the chamber.

The gas chamber 11 normally is not pressurized, but at low operational speeds may be placed under pressure by directing gas through a passage 51 through the housing 27. The passage leads into the chamber 11 and is threaded at 52 for connection of a gas supply line.

It will be appreciated that in some arrangements the dynamic seal may be employed without the second gas chamber 11 and seal 12.

In the present embodiment, at the lower end of the second gas chamber 11 is located the seal 12 which includes an annular ring 53 secured to the shaft and provided with a groove 53a for carrying a carbon sealing ring 54. The sealing ring has an axially facing sealing surface against which is sealingly located a second sealing ring 56. Both sealing rings are coated to permit dry running with the coatings for the rings 54 and 56 shown at 54a and 56a, respectively. The ring 56 is axially movable and is carried on a support ring 57 which is mounted at the lower end of an expansible bellows 58 which is slightly biased to hold the ring 56 in sealing engagement with the ring 54. The upper end of the bellows is connected to a flanged shell 59 for sealingly securing it with respect to the housing 27.

In operation, the bismuth pool 26 is heated to a liquid state in order that the shaft 6 may rotate with the dynamic seal forming a pressure seal at the end of the impeller flange 46. The bismuth is heated by the heating element 38. The chamber 8 is under a slight pressure and the liquid pressure at the end of the sealing chamber 18 prevents any passage of gas between the chambers 8 and 11. When the shaft runs at low speed so that the centrifugal pressure of the rotating impeller flange 46 is insufficient to support the pressure gradient across the seal, the chamber 11 is pressurized to reduce the pressure gradient to zero. The rotary seal 12 prevents the escape of gas from the lower gas chamber 11.

Figure 5:
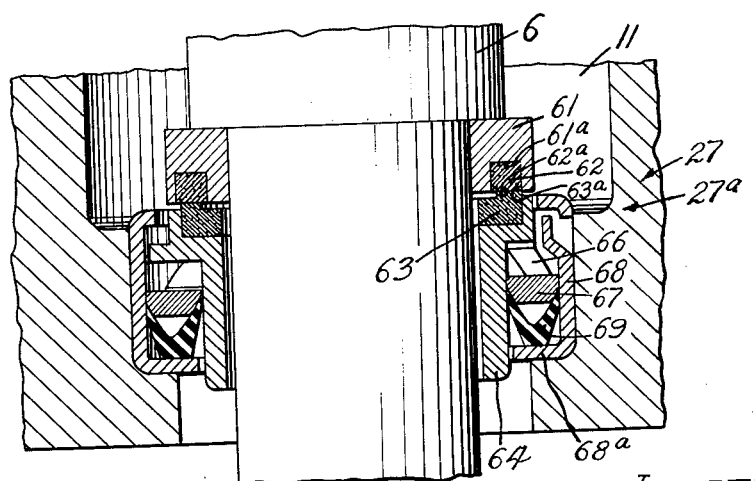

FIGURE 5 illustrates a modified form of the seal 12 of FIGURE 1. The seal 12a of FIGURE 5 includes an annular ring 61 mounted on the shaft 6. The ring has an axially facing groove 61a in which is recessed a carbon ring 62. The carbon ring has an axially facing annular sealing face against which rides the sealing face of a mating carbon sealing ring 63. Each of the rings 62 and 63 are coated with a chemical coating 62a and 63a, respectively, for dry running. The coating is a solid film lubricant or a chemical that promotes the formation of solid film lubricants.

The sealing ring 63 is mounted on a support sleeve 64. The support sleeve is biased by a compression spring 66 to hold the sealing ring 63 in sealing engagement with the sealing ring 62. The spring 66 is backed by an annular ring 67 which is supported on a carrier sleeve 68 mounted in the housing 27. The carrier sleeve has an inwardly extending end flange 68a against which rests a V-shaped packing ring 69, and the ring 67 rests between the side legs of the V-shaped packing ring. The seal 12a provides a rotary seal permitting the chamber 11 to be pressurized with gas.

As an example of the method of operation of the seal at varying operating speeds, a seal having the design of the seal assembly illustrated has been found to maintain a dynamic seal pressure and to be capable of maintaining a 10 p.s.i.a. differential across the seal at approximately 300 r.p.m. The chamber 8 is pressurized at 17 p.s.i.a. with helium gas. At speeds below 300 r.p.m., the second gas chamber 11 also will be pressurized to 17 p.s.i.a. to reduce the pressure gradient across the liquid dynamic seal to zero. When operating at speeds above 300 r.p.m., the gas pressure in the chamber 11 is dropped to atmospheric pressure, because the dynamic seal can create sufficient centrifugal head to support the pressure in chamber 11. At low operating speeds, however, zero pressure drop is maintained across the dynamic seal to prevent the liquid bismuth from being blown out of the assembly, and to prevent leakage across the sealing chamber.

When the pump is stopped, coolant is directed into the chamber 32 to solidify the bismuth and a solid plug now prevents leakage. The pressure in the chamber 11 may then be released.

If the coated carbon rotary seal 12 or 12a wears, the small leakage will result in pressure drop during operation in chamber 11, but a pressure regulator, not shown, can be utilized to maintain the gas pressure to prevent bismuth blow-out. The leakage present is dependent on the pressure drop across the rotary seal, and may be low over a large part of the operating cycle.

With the bismuth solidified, disassembly and servicing of the mechanism above the seal may be performed without concern as to disassembly of the pump, or leakage during the service period. The gas cavity above the dynamic seal is opened to atmosphere and it is then possible to remove all of the components above the seal.

During operation, at normal high speeds, if the system is operating under pressure, the gas pressure above the seal may be controlled to be maintained at substantially 1 p.s.i.a. higher than the system pressure. This may be accomplished by the use of a pressure transducer below the dynamic seal chamber which will feed back the signal that will be used to actuate the gas supply valve controlling the pressure in the chamber above the seal.

Thus it will be seen that I have provided an improved seal system and method of operating the seal which provides an absolute seal, and is well suited to use where leakage must be positively prevented. The seal assembly meets the objectives and advantages hereinbefore set forth, and provides a pressurized column of liquid during operation which will prevent the escape of gas along the shaft.

I have, in the drawings and specification, presented a detailed disclosure of the preferred embodiments of my invention, and it is to be understood that I do not intend to limit the invention to the specific forms disclosed, but intend to cover all modifications, changes and alternative constructions and methods falling within the scope of the principles taught by my invention.

I claim as my invention:

1. The method of preventing leakage past a liquid seal including an annular sealing chamber surrounding a rotating shaft and receiving an annular impeller attached to the shaft for forcing liquid outwardly in the chamber to form a pressure seal, the method comprising the steps of providing a fluid backing for the liquid in the chamber during relatively slow rotational speeds of the rotary member adequate to provide sufficient sealing pressure in the liquid, and solidifying the liquid during periods of non-rotation of the rotary member.

2. A rotary seal for a rotating member comprising a housing having an annular inwardly facing sealing liquid chamber, an impeller having an annular flange portion coaxial with the sealing liquid chamber and extending radially outwardly into the chamber, means for connecting the impeller to a rotating member coaxially located with respect to the chamber whereby a sealing liquid in the chamber will be centrifugally forced outwardly into the chamber to form a pressure seal between said flange portion and the walls of the chamber, means defining a closed gas pressure chamber open to said sealing liquid chamber, and conduit means open to said gas chamber for pressurizing the gas chamber and pressurizing one side of said liquid chamber so that if gas leakage occurs across the liquid chamber it will flow from said pressurized one side to the other side.

3. A rotary seal assembly comprising a rotating member having an annular radially extending impeller portion, means defining an annular chamber facing inwardly toward said impeller portion and receiving the impeller portion and adapted to contain a sealing material capable of being converted between a solid and liquid state for forming a seal between the impeller portion and the walls of said chamber, and a cooling device positioned adjacent said chamber to decrease the temperature of said material to convert it from a liquid to a solid state during periods of rest of said impeller portion.

4. A rotary seal assembly comprising in combination a rotatable member, an annular impeller secured to the rotatable member and projecting radially outwardly, means defining an annular sealing chamber facing radially inwardly and receiving said impeller and adapted for containing a sealing material capable of being converted between a solid and a liquid state with temperature change, a heater positioned in heat transfer relationship with said chamber for increasing the temperature of material in said chamber and converting the material to a liquid state for rotation of the impeller to form a liquid pressure seal between the impeller and the walls of the chamber, and a cooling device positioned adjacent said chamber in heat transfer relationship with said chamber for changing the material in the chamber from a liquid state to a solid state for periods of non-rotation of the impeller in said chamber.

5. A seal for a rotary member providing an absolute barrier for the escape of gas along said rotary member comprising means defining an annular liquid chamber facing inwardly toward said rotary member, an impeller member connected to the rotary member and projecting into said chamber for forcing liquid outwardly against an outer wall of the chamber to form a pressurized liquid seal during high speed operation of the rotary member, means for solidifying the liquid in said chamber during periods of non-rotation, and means for providing a fluid pressure backing for said sealing liquid during periods of slow rotation when the pressure of the liquid caused by said impeller member is inadequate to provide sufficient sealing liquid pressure to prevent leakage past the chamber.

References Cited in the file of this patent

UNITED STATES PATENTS

| | | |
|---|---|---|
| 1,695,320 | Carrier | Dec. 18, 1928 |
| 1,732,761 | Marsland | Oct. 22, 1929 |
| 1,841,298 | Ploeger | Jan. 12, 1932 |
| 1,947,017 | McHugh | Feb. 13, 1934 |
| 2,145,123 | Mason | Jan. 24, 1939 |
| 2,381,823 | La Bour | Aug. 7, 1945 |
| 2,429,481 | Mohr et al. | Oct. 21, 1947 |
| 2,581,504 | Wilfley | Jan. 8, 1952 |
| 2,622,902 | Malmoik | Dec. 23, 1952 |
| 2,646,999 | Barske | July 28, 1953 |